(12) United States Patent
Han et al.

(10) Patent No.: US 11,928,274 B2
(45) Date of Patent: Mar. 12, 2024

(54) PROTECTIVE FILM AND METHOD FOR MANUFACTURING SAME, TOUCH PANEL, AND DISPLAY DEVICE

(71) Applicants: Wuhan BOE Optoelectronics Technology Co., Ltd., Hubei (CN); BOE Technology Group Co., Ltd., Beijing (CN)

(72) Inventors: Jie Han, Beijing (CN); Yuanhui Guo, Beijing (CN); Xiaoguang Yang, Beijing (CN); Xiaoyu Huang, Beijing (CN); Yang Hu, Beijing (CN)

(73) Assignees: Wuhan BOE Optoelectronics Technology Co., Ltd., Hubei (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/779,291

(22) PCT Filed: Jul. 7, 2021

(86) PCT No.: PCT/CN2021/105032
§ 371 (c)(1),
(2) Date: May 24, 2022

(87) PCT Pub. No.: WO2022/042064
PCT Pub. Date: Mar. 3, 2022

(65) Prior Publication Data
US 2022/0391030 A1    Dec. 8, 2022

(30) Foreign Application Priority Data
Aug. 26, 2020    (CN) .......................... 202010872725.5

(51) Int. Cl.
*G06F 3/041*    (2006.01)
*G06F 3/044*    (2006.01)
*G02B 1/14*    (2015.01)

(52) U.S. Cl.
CPC ............ *G06F 3/0412* (2013.01); *G06F 3/044* (2013.01); *G02B 1/14* (2015.01);
(Continued)

(58) Field of Classification Search
CPC ...... G06F 3/044; G06F 3/0412; G06F 3/0445; G06F 3/041; G06F 2203/04103;
(Continued)

(56) References Cited

U.S. PATENT DOCUMENTS

2010/0012966 A1* 1/2010 Choi ................. H10K 50/8426
257/E33.056
2010/0304133 A1    12/2010 Maeda
(Continued)

FOREIGN PATENT DOCUMENTS

CN    101965230 A    2/2011
CN    102744954 A    10/2012
(Continued)

OTHER PUBLICATIONS

CN202010872725.5 first office action.
CN202010872725.5 second offfice action.

*Primary Examiner* — Darlene M Ritchie
(74) *Attorney, Agent, or Firm* — IPro, PLLC

(57) ABSTRACT

A protective film includes a transparent substrate layer and a transparent hardened layer covering a surface of the transparent substrate layer. The transparent hardened layer includes a first region covering a middle portion of the transparent substrate layer and a second region covering an edge of the transparent substrate layer, where hardness of the first region is greater than hardness of the second region. The transparent hardened layer includes the first region and the second region.

17 Claims, 6 Drawing Sheets

(52) U.S. Cl.
CPC .............. *G06F 2203/04103* (2013.01); *G06F 2203/04107* (2013.01); *G06F 2203/04112* (2013.01)

(58) Field of Classification Search
CPC . G06F 2203/04107; G06F 2203/04112; G09F 9/30; C08J 7/04; C08J 7/046; C08J 2367/02; C08L 67/02; G02B 1/14
See application file for complete search history.

(56) References Cited

U.S. PATENT DOCUMENTS

| | | | | |
|---|---|---|---|---|
| 2012/0276354 | A1* | 11/2012 | Thompson | B32B 7/022 156/307.3 |
| 2013/0302619 | A1 | 11/2013 | Wei et al. | |
| 2014/0145977 | A1 | 5/2014 | Kang | |
| 2016/0320803 | A1* | 11/2016 | Oh | B32B 3/085 |
| 2018/0024592 | A1* | 1/2018 | Lim | C08J 7/046 345/173 |
| 2019/0235682 | A1* | 8/2019 | Choi | H10K 77/111 |

FOREIGN PATENT DOCUMENTS

| | | |
|---|---|---|
| CN | 103869387 A | 6/2014 |
| CN | 108490513 A | 9/2018 |
| CN | 108586782 A | 9/2018 |
| CN | 109880411 A | 6/2019 |
| CN | 110231891 A | 9/2019 |
| JP | 2007086290 A | 4/2007 |
| JP | 2011256249 A | 12/2011 |
| JP | 2020091395 A | 6/2020 |
| JP | 2020095203 A | 6/2020 |
| KR | 20190018215 A | 2/2019 |

* cited by examiner

PROTECTIVE FILM AND METHOD FOR MANUFACTURING SAME, TOUCH PANEL, AND DISPLAY DEVICE

CROSS-REFERENCE TO RELATED APPLICATION

This application is a US national phase application based on PCT/CN2021/105032, filed on, Jul. 7, 2021, which claims priority of the Chinese Patent Application No. 202010872725.5, filed on Aug. 26, 2020 and entitled "PROTECTIVE FILM AND METHOD FOR MANUFACTURING SAME, TOUCH PANEL, AND DISPLAY DEVICE", the disclosures of which are herein incorporated by reference in their entireties.

TECHNICAL FIELD

The present disclosure relates to the field of display devices, and in particular, relates to a protective film and a method for manufacturing the same, a touch panel, and a display device.

BACKGROUND

In a display device, various substrates are generally thin and fragile. For example, substrates in a display panel and touch panel, are very thin and prone to scratches or even cracks.

SUMMARY

Embodiments of the present disclosure provide a protective film and a method for manufacturing the same, a touch panel, and a display device.

In a first aspect, the embodiments of the present disclosure provide a protective film. The protective film includes a transparent substrate layer and a transparent hardened layer covering a surface of the transparent substrate layer. The transparent hardened layer includes a first region covering a middle portion of the transparent substrate layer and a second region covering an edge of the transparent substrate layer, wherein a hardness of the first region is greater than a hardness of the second region.

In some embodiments, the second region is disposed around the first region; or
the transparent substrate layer has two opposite sides that are arranged in parallel, and the second region is disposed on each of the two opposite sides of the transparent substrate layer.

In some embodiments, a width of the second region in a direction perpendicular to the two sides ranges from 200 mm to 205 mm.

In some embodiments, the transparent hardened layer is formed by curing a photocurable coating.

In some embodiments, the hardness of the first region ranges from 5.5 H to 6.5 H, and the hardness of the second region ranges from 2.5 H to 3.5 H.

In some embodiments, the thickness of the transparent hardened layer is not greater than 10 μm.

In a second aspect, the embodiments of the present disclosure further provide a method for manufacturing a protective film. The method includes: providing a transparent substrate layer; and
forming a transparent hardened layer covering a surface of the transparent substrate layer on the transparent substrate layer, wherein the transparent hardened layer includes a first region covering a middle portion of the transparent substrate layer and a second region covering an edge of the transparent substrate layer, a hardness of the first region being greater than a hardness of the second region.

In some embodiments, forming the transparent hardened layer covering the surface of the transparent substrate layer on the transparent substrate layer includes:
forming a photocurable coating on the surface of the transparent substrate layer; and
curing, by light irradiation, the photocurable coating into the transparent hardened layer, wherein a light irradiation duration of the photocurable coating disposed on the middle portion of the transparent substrate layer is longer than light irradiation duration of the photocurable coating disposed at the edge of the transparent substrate layer.

In some embodiments, curing, by light irradiation, the photocurable coating into the transparent hardened layer includes:
Shielding, using a light-shielded plate, the photocurable coating disposed at the edge of the transparent substrate layer;
irradiating the photocurable coating with light; and
removing the light-shielded plate and continuing to irradiate the photocurable coating with light; or
curing, by light irradiation, the photocurable coating into the transparent hardened layer includes:
irradiating the photocurable coating with light;
shielding, using the light-shielding plate, the photocurable coating disposed at the edge of the transparent substrate layer with the light-shielded plate; and
continuing to irradiate the photocurable coating with light.

In some embodiments, shielding, using the light-shielding plate, the photocurable coating disposed at the edge of the transparent substrate layer includes:
shielding the photocurable coating disposed around the transparent substrate layer; or
shielding the photocurable coating at a group of opposite sides of the transparent substrate layer, wherein the transparent substrate layer is in a rectangular shape.

In a third aspect, the embodiments of the present disclosure further provide a touch panel. The touch panel includes: a transparent substrate, a touch structure disposed on the transparent substrate, and the protective film according to the first aspect, wherein the protective film is disposed on one side of the transparent substrate, and the touch structure is disposed on the other side of the transparent substrate.

In some embodiments, a width of the first region of the protective film is less than a width of the transparent substrate, and a difference between the widths ranges from 0.1 mm to 1 mm.

In some embodiments, the touch structure includes a first transparent insulation layer disposed on the transparent substrate, a first metal mesh disposed on the first transparent insulation layer, a second transparent insulation layer disposed on the first metal mesh, a second metal mesh disposed on the second transparent insulation layer, and a third transparent insulation layer disposed on the second metal mesh.

In a fourth aspect, the embodiments of the present disclosure further provided a display device. The display device includes the touch panel according to the third aspect, and the display panel is disposed at a side, distal from the protective film, of the transparent substrate.

BRIEF DESCRIPTION OF THE DRAWINGS

To describe the technical solutions in the embodiments of the present disclosure more clearly, the accompanying drawings required for describing the embodiments will be described below. Obviously, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the purposes, technical solutions, and advantages of the present disclosure, the embodiments of the present disclosure are described in detail below with reference to the accompanying drawings.

Figure 1:
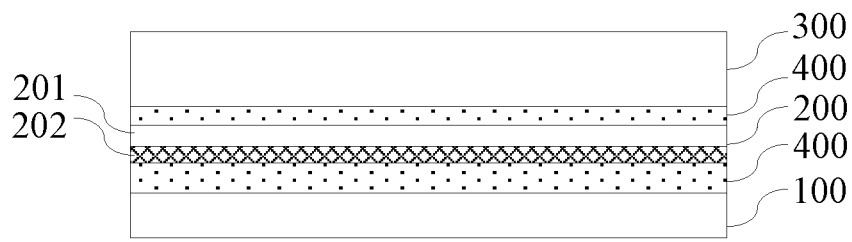
FIG. 1 is a structural schematic diagram of a display device in the related art.

In a display device, various substrates are generally thin and fragile. To avoid damage to the substrate, cover glass (CG) is usually disposed to provide protection. For example, FIG. 1 is a structural schematic diagram of a display device in the related art. As shown in FIG. 1, the display device includes a display panel 100, a touch panel 200 and a CG 300 that are sequentially stacked; wherein the display panel 100 and the touch panel 200 are bonded by an optical adhesive 400, and the touch panel 200 and the CG 300 are bonded by the optical adhesive 400. The touch panel 200 includes a transparent substrate 201 and a touch structure 202 disposed on the transparent substrate 201. The transparent substrate 201 of the touch panel 200 is very thin and prone to scratches or even cracks. The CG 300 may protect the transparent substrate 201 of the touch panel 200 from being damaged. However, the thickness and weight of the CG 300 are both greater, for example, a sum of thicknesses of the CG 300 and the touch panel 200 usually reaches 3.95 mm, which is not conducive to thinning of the display device. Moreover, since the thickness of the CG 300 is great, a wider bezel is required to prevent light leakage from an edge of the CG 300, which is not conducive to reducing the width of the bezel.

Figure 2:
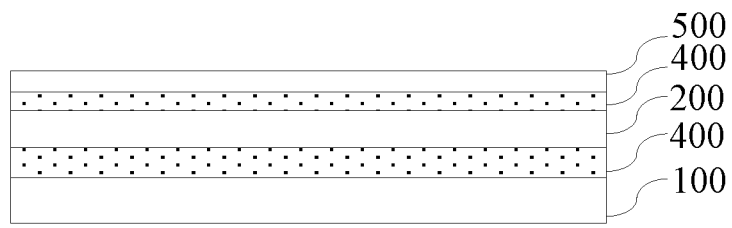
FIG. 2 is a structural schematic diagram of a display device in the related art.

To reduce the thickness and weight of the display device, the substrate is protected by disposing a hardened film with high hardness thereon in the related art. FIG. 2 is a structural schematic diagram of a display device in the related art. As shown in FIG. 2, a hardened film 500 is bonded on the touch panel 200 of the display device by the optical adhesive 400. A sum of thicknesses of the hardened film 500 and the touch panel 200 ranges only from 0.55 mm to 0.7 mm, thereby greatly reducing the thickness of the display device compared to the CG300. The hardened film 500 needs to be cut, prior to attaching the hardened film 500 to the transparent substrate 201, to match the size of the hardened film 500 with the size of the transparent substrate 201. However, the hardened film 500 with high hardness is susceptible to ambient temperature and humidity, which causes warping and deformation at the edge. Moreover, during laser cutting, an incision is often uneven, and is prone to burrs. Punching with a cutting tool may form a dent. As films are generally stored in rolls, the above-described problems are particularly severe due to the impact of stress in the case that the rolled film is unrolled and cut along a length direction. These problems may cause defects such as air bubbles to be generated at the edge of the hardened film 500 in the case that the hardened film 500 is attached to the transparent substrate 201.

Figure 3:
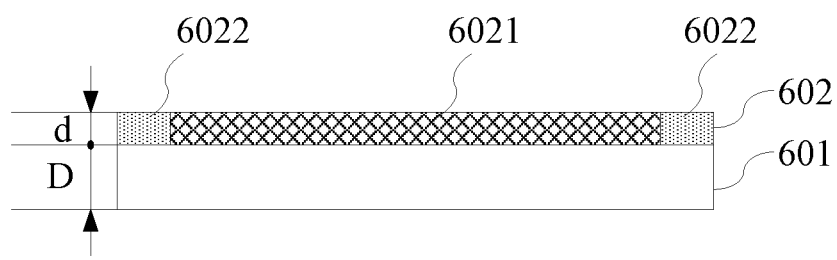
FIG. 3 is a structural schematic diagram of a protective film according to an embodiment of the present disclosure.

FIG. 3 is a structural schematic diagram of a protective film according to an embodiment of the present disclosure. As shown in FIG. 3, the protective film includes a transparent substrate layer 601 and a transparent hardened layer 602 covering a side of the transparent substrate layer 601. The transparent hardened layer 602 includes a first region 6021 covering a middle portion of the transparent substrate layer 601 and a second region 6022 covering an edge of the transparent substrate layer 601, wherein the hardness of the first region 6021 is greater than the hardness of the second region 6022.

The first region 6021 and the second region 6022 are two portions of the transparent hardened layer 602 that are disposed at different positions on a surface of the transparent substrate layer 601, and the first region 6021 and the second region 6022 have different hardness.

The transparent hardened layer includes the first region and the second region. As a result, the first region disposed in the middle portion of the transparent substrate layer may provide better protection, and the second region disposed at the edge of the transparent substrate layer may avoid burrs or dents formed during cutting, such that air bubbles are not easily generated after the transparent hardened layer is attached to the substrate, and warping and deformation are not easily caused by impacts of ambient temperature and humidity.

An entire surface of the transparent substrate layer 601 is covered by the transparent hardened layer 602. In this way, in the case that the protective film is cut, cutting may be performed in the first region and the second region to cut the protective film to a desired size, and then the protective film is attached to the substrate.

In some embodiments, the hardness of the first region 6021 ranges from 5.5 H to 6.5 H, and the hardness of the second region 6022 ranges from 2.5 H to 3.5 H. In an exemplary embodiment, the first region 6021 has a hardness of 6 H, and the second region 6022 has a hardness of 3 H. By setting a more appropriate hardness range, the first region 6021 may provide better protection, and the second region 6022 may provide better cutting quality.

As shown in FIG. 3, the thickness d of the transparent hardened layer 602 is not greater than 10 μm. The transparent hardened layer 602 with the thickness within 10 μm may provide sufficient protection. A protection film with an excessively thick transparent hardened layer 602 is not only unfavorable to the storage of the protective film by being manufactured into a roll, but also not conductive to the thinning of the display device.

In some embodiments, the transparent hardened layer 602 is formed by curing a photocurable coating. The photocurable coating may be cured by a cross-linking reaction under light irradiation, wherein the hardness after curing is related to the degree of the cross-linking reaction, and the degree of the cross-linking reaction is related to light irradiation duration. Therefore, in the case that the transparent hardened layer 602 is manufactured with the photocurable coating, the first region 6021 and the second region 6022 may be formed by controlling the light irradiation duration, thereby facilitating manufacturing.

As shown in FIG. 3, the thickness D of the transparent substrate layer 601 may range from 200 μm to 250 μm. In an exemplary embodiment of the present disclosure, the transparent substrate layer has a thickness of 244 μm. The transparent hardened layer 602 is used as a carrier. Although the transparent substrate layer 601 has a lower hardness, an excessive thickness is not conducive to the storage of the protective film by being manufactured into a roll, and may also increase the thickness of the display device. In addition, in the case that the protective film is applied to a touch panel, the thicker protective film may also increase the distance between a finger and the touch panel, thereby affecting touch sensitivity.

In some embodiments, the transparent substrate layer 601 may be a polyethylene terephthalate (PET) film. The PET film has better creep resistance, fatigue resistance and friction resistance within a wider temperature range.

Figure 4:
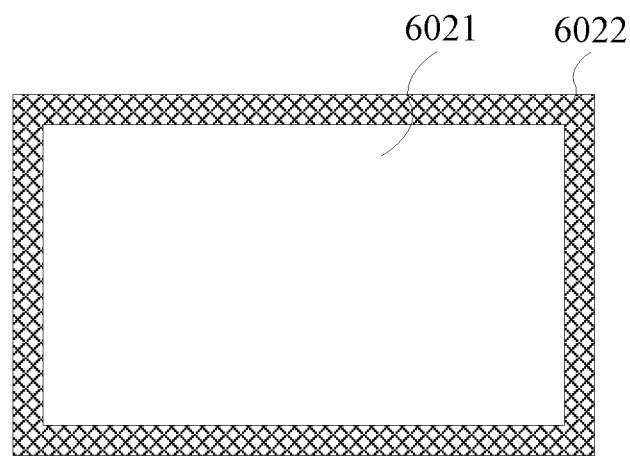
FIG. 4 is a top view of a protective film according to an embodiment of the present disclosure.

FIG. 4 is a top view of a protective film according to an embodiment of the present disclosure. As shown in FIG. 4, the second region 6022 may be disposed around the first region 6021. That is, the first region 6021 is surrounded by the second region 6022, such that cutting may be performed around the protective film to obtain a protective film of appropriate size.

Figure 5:
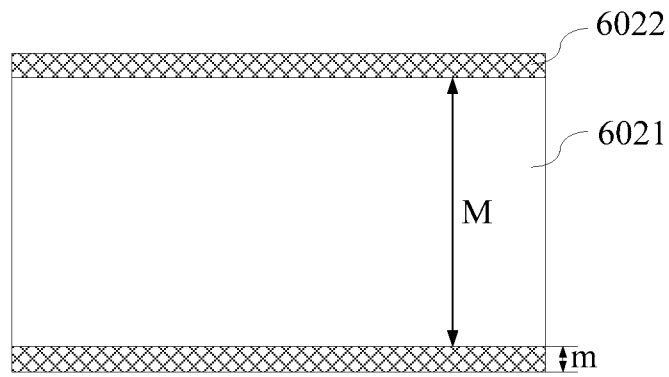
FIG. 5 is a structural schematic diagram of a protective film according to an embodiment of the present disclosure.

FIG. 5 is a structural schematic diagram of a protective film according to an embodiment of the present disclosure. As shown in FIG. 5, the transparent substrate layer 601 may have two opposite sides that are arranged in parallel. The second region 6022 is disposed on each of two opposite sides of the transparent substrate layer 601, which facilitates the storage of the protective film by being rolled into a roll.

In an exemplary embodiment, the transparent substrate layer 601 is in a rectangular shape. As shown in FIG. 5, the second region 6022 is disposed at two long sides of the transparent substrate layer 601, such that the protective film may be rolled up with a short side of the transparent substrate layer 601 as an axis for easy storage. During use, as the problem caused in the case of cutting along a direction perpendicular to long sides is fewer, a protective film with an appropriate length is obtained by cutting the transparent substrate layer along a direction perpendicular to long sides. As problems such as burrs are more likely to cause in the case of cutting along the long sides, the second region 6022 may be disposed only at two long sides. The width m of the second region 6022 may range from 200 mm to 205 mm in the direction perpendicular to two sides. The second region 6022 is arranged with a greater width, which ensures a sufficient region for cutting in the case that the protective film is cut. Moreover, the first region 6021 may also be protected, during storage of the protective film, to prevent the edge of the first region 6021 from being damaged.

The width of the first region 6021 is less than the width of a substrate to be protected in the direction perpendicular to two sides. The width M of the first region 6021 may be set according to the width of the substrate to be protected. For example, the width of the first region 6021 may be less than the width of the substrate to be protected, and a difference between the widths ranges from 0.1 mm to 1 mm. The width M of the first region 6021 is slightly less than the width of the substrate to be protected, which ensures that the first region 6021 is not cut in the case that the protective film is cut.

Figure 6:
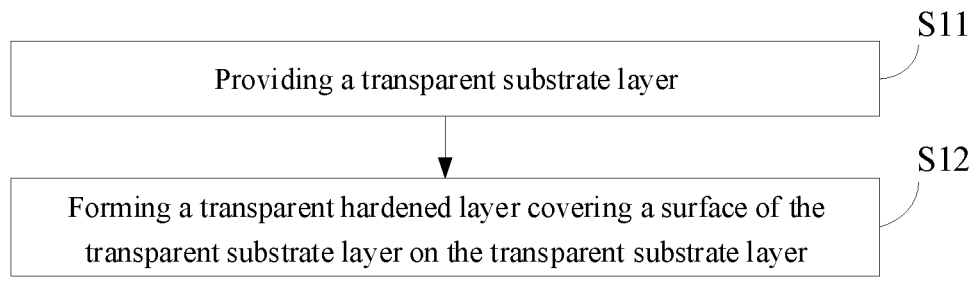
FIG. 6 is a flowchart of a method for manufacturing a protective film according to an embodiment of the present disclosure.

FIG. 6 is a flowchart of a method for manufacturing a protective film according to an embodiment of the present disclosure. The method is applicable for manufacturing the protective film shown in FIG. 3 to FIG. 5. As shown in FIG. 6, the method includes the following processes.

In S11, a transparent substrate layer is provided.

In S12, a transparent hardened layer covering a surface of the transparent substrate layer is formed on the transparent substrate layer.

The transparent hardened layer includes a first region covering a middle portion of the transparent substrate layer and a second region covering an edge of the transparent substrate layer, wherein the hardness of the first region is greater than the hardness of the second region.

The transparent hardened layer includes the first region and the second region. As a result, the first region disposed in the middle portion of the transparent substrate layer may provide better protection, and the second region disposed at the edge of the transparent substrate layer may avoid burrs or dents formed during cutting, such that air bubbles are not easily generated after the transparent hardened layer is attached to the substrate, and warping and deformation are not easily caused by impacts of ambient temperature and humidity.

Figure 7:
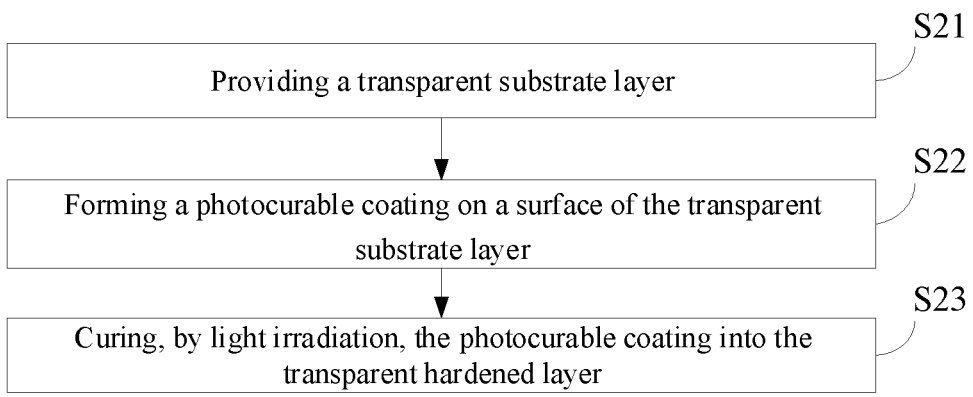
FIG. 7 is a flowchart of a method for manufacturing a protective film according to an embodiment of the present disclosure.

FIG. 7 is a flowchart of a method for manufacturing a protective film according to an embodiment of the present disclosure. As shown in FIG. 7, the method includes the following processes.

In S21, a transparent substrate layer is provided.

In some embodiments, the transparent substrate layer may be a PET film. The PET film has better creep resistance, fatigue resistance and friction resistance within a wider temperature range.

In some embodiments, the thickness of the transparent substrate layer may range from 200 μm to 250 μm. The embodiments of the present disclosure take the transparent substrate layer with a thickness of 244 μm as an example. The transparent hardened layer is used as a carrier. Although the transparent substrate layer has a lower hardness, an excessive thickness is not conducive to the storage of the protective film by being manufactured into a roll, and may also increase the thickness of the display device. In addition, in the case that the protective film is applied to a touch panel, the thicker protective film may also increase the distance between a finger and the touch panel, thereby affecting touch sensitivity.

In S22, a photocurable coating is formed on a surface of the transparent substrate layer.

The photocurable coating may be cured by a cross-linking reaction under light irradiation, wherein the hardness after curing is related to the degree of the cross-linking reaction, and the degree of the cross-linking reaction is related to light irradiation duration. Therefore, in the case that the transparent hardened layer 602 is manufactured with the photocurable coating, the first region 6021 and the second region 6022 may be formed by controlling the light irradiation duration, thereby facilitating manufacturing.

In an exemplary embodiment, the photocurable coating may be coated on a surface of the transparent substrate layer by a coating roller.

In some embodiments, the photocurable coating may also be dried after being coated. For example, the transparent substrate layer coated with the photocurable coating may pass through a drying oven. The photocurable coating may be preliminarily shaped by removing a liquid medium in the photocurable coating during drying.

In S23, the photocurable coating is cured into the transparent hardened layer by light irradiation.

The light irradiation duration of the photocurable coating disposed on the middle portion of the transparent substrate layer is longer than the light irradiation duration of the photocurable coating disposed at the edge of the transparent substrate layer. Generally, the light irradiation may be performed with ultraviolet light.

Figure 8:
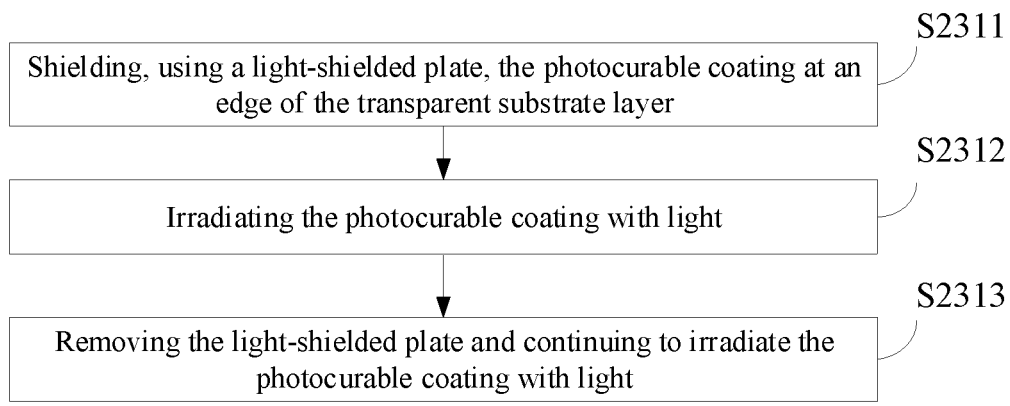
FIG. 8 is a flowchart of performing a light irradiation according to an embodiment of the present disclosure.

FIG. 8 is a flowchart of performing a light irradiation according to an embodiment of the present disclosure. As shown in FIG. 8, the photocurable coating may be cured to the transparent hardened layer by the light irradiation in the following manner.

In step S2311, the photocurable coating disposed at the edge of the transparent substrate layer is shielded by a light-shielded plate.

In step S2312, the photocurable coating is irradiated with light.

In step S2313, the light-shielded plate is removed, and the photocurable coating is continued to be irradiated with light.

The photocurable coating disposed at the edge of the transparent substrate layer is shielded by the light-shielded plate, such that the photocurable coating disposed at the edge of the transparent substrate layer is not irradiated by the light. Therefore, in step S2312, in the case that the photocurable coating is irradiated with light, only the photocurable coating disposed on the middle portion of the transparent substrate layer is irradiated. In step S2313, after the light-shielded plate is removed, photocurable coatings in all regions of the transparent substrate layer may be irradiated. In this way, after processes S2311 to S2313, the photocurable coating disposed on the middle portion of the transparent substrate layer is cured to the first region with a relatively higher hardness due to the light irradiation for all the time, and the photocurable coating disposed at the edge of the transparent substrate layer is cured to the second region with a relatively lower hardness due to the light irradiation for a shorter time. By selecting a timing of removing the light-shielded plate, a duration difference of light irradiation between the photocurable coating disposed on the middle portion of the transparent substrate layer and the photocurable coating disposed at the edge of the transparent substrate layer may be controlled. In this way, the photocurable coatings at the two positions may reach different hardness after curing. The hardness of the cured photocurable coating is related to the total duration of light irradiation, wherein the duration of light irradiation may be determined according to an experiment. The light irradiation may be stopped after reaching the duration, such that the hardness of the first region and the second region meets requirements.

Figure 9:
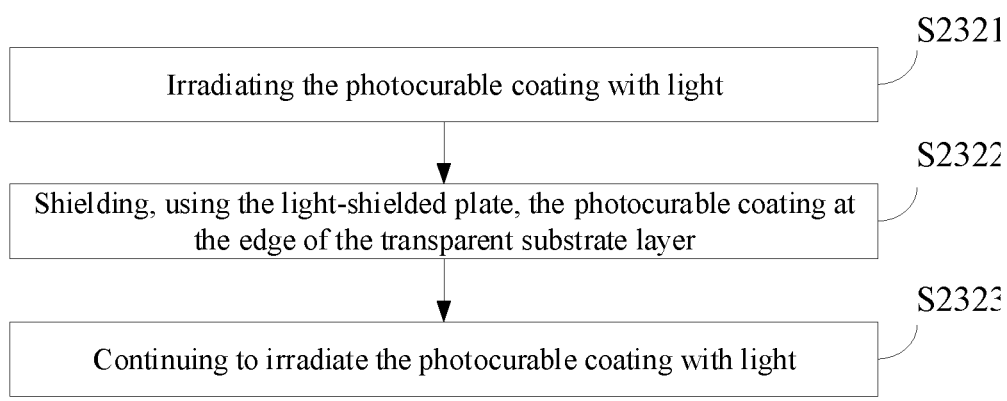
FIG. 9 is a flowchart of performing another light irradiation according to an embodiment of the present disclosure.

FIG. 9 is a flowchart of performing another light irradiation according to an embodiment of the present disclosure. As shown in FIG. 9, the photocurable coating may be cured to the transparent hardened layer by the light irradiation in the following manner.

In step S2321, the photocurable coating is irradiated with light.

In step S2322, the photocurable coating disposed at the edge of the transparent substrate layer is shielded by a light-shielded plate.

In step S2323, the photocurable coating is continued to be irradiated with light.

Firstly, the photocurable coatings in all regions of the transparent substrate layer are irradiated with light. After a period of light irradiation, the photocurable coating disposed at the edge of the transparent substrate layer is shielded by the light-shielded plate, and light irradiation of the region is ended to form the second region with a relatively lower hardness. Subsequently, the photocurable coating disposed on the middle portion of the transparent substrate layer is only irradiated with light to form the first region with a relatively higher hardness. By selecting the shielding timing, the duration difference of light irradiation between the photocurable coating disposed on the middle portion of the transparent substrate layer and the photocurable coating disposed at the edge of the transparent substrate layer may be controlled. In this way, the photocurable coatings at the two positions may reach different hardness after curing. The hardness of the cured photocurable coating is related to the total duration of light irradiation, wherein the duration of light irradiation may be determined according to an experiment, and the light irradiation may be stopped after reaching the duration, such that the hardness of the first region and the second region meets requirements.

In processes S2311 and S2322, in the case that the light-shielded plate is used for shielding, the photocurable coating disposed around the transparent substrate layer may be shielded. In this way, the protective film as shown in FIG. 4 is manufactured.

In some embodiments, in the case that the transparent substrate layer is in a rectangular shape, the photocurable coating at two opposite sides of the transparent substrate layer may be shielded. In this way, the protective film as shown in FIG. 5 is manufactured.

In the embodiments of the present disclosure, shielding, using the light-shielded plate, the photocurable coating disposed at the edge of the transparent substrate layer refers to that the photocurable coating disposed at the edge of the transparent substrate layer is not irradiated by light emitted from a light source by changing relative positions among the light-shielded plate, the transparent substrate layer and the light source for irradiation. Removing the light-shielded plate refers to that the photocurable coating disposed at the edge of the transparent substrate layer is irradiated by the light emitted from the light source by changing the relative positions among the light-shielded plate, the transparent substrate layer and the light source for irradiation. In the case that the relative positions among the light-shielded plate, the transparent substrate layer and the light source for irradiation are changed, the position of any one of the three may be changed, or the positions of two or all of the three may be changed.

Figure 10:
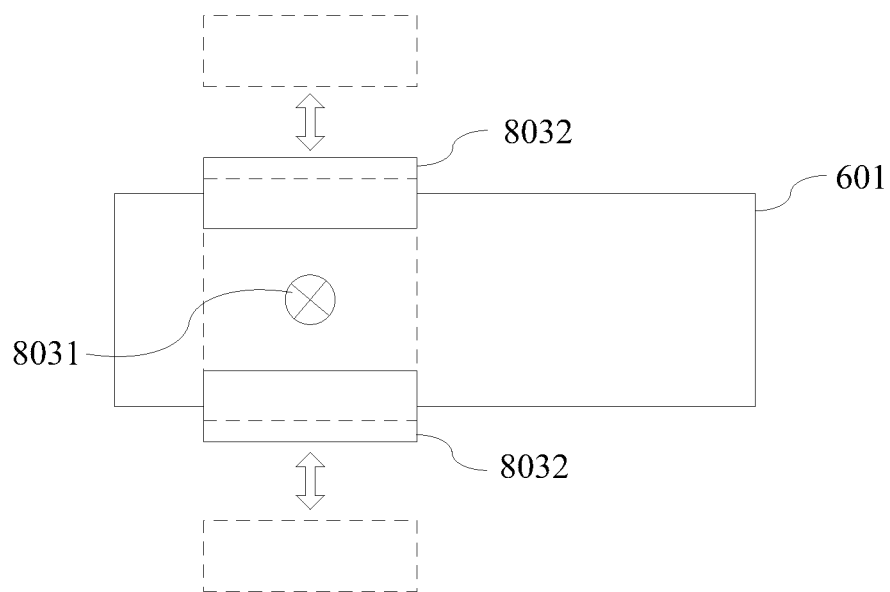
FIG. 10 is a schematic diagram of a light irradiation process according to an embodiment of the present disclosure.

For example, FIG. 10 is a schematic diagram of a light irradiation process according to an embodiment of the present disclosure. As shown in FIG. 10, in the case that the light-shielded plate 8032 is used for shielding, the transparent substrate layer 601 and the light source 8031 may remain unchanged, and the light-shielded plate 8032 may be moved. In FIG. 10, a two-way arrow indicates a moving direction of the light-shielded plate 8032, and a filled region indicates a range illuminable by the light source 8031, regardless of whether the light source 8031 is turned on. The light-shielded plate 8032 is moved to a position shown in FIG. 10 to shield the transparent substrate layer 601.

Figure 11:
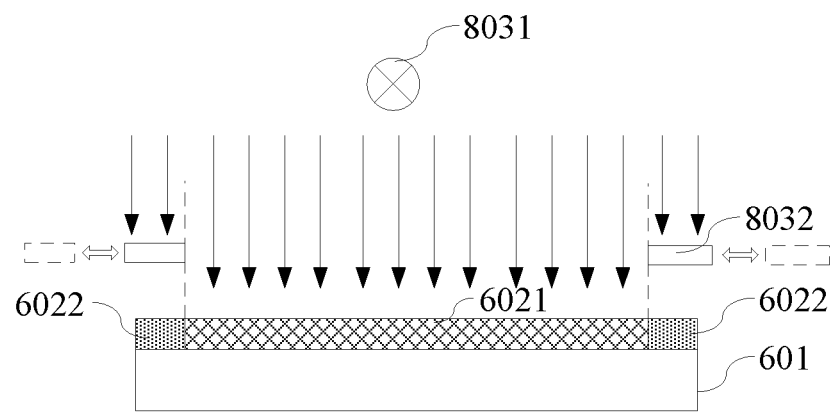
FIG. 11 is a schematic diagram of a light irradiation process according to an embodiment of the present disclosure.

FIG. 11 is a schematic diagram of a light irradiation process according to an embodiment of the present disclosure. As shown in FIG. 11, the light source 8031 is unable to illuminate the edge of the transparent substrate layer 601 under the shielding of the light-shielded plate 8032, but is able to illuminate the middle portion of the transparent substrate layer 601 all the time.

Figure 12:
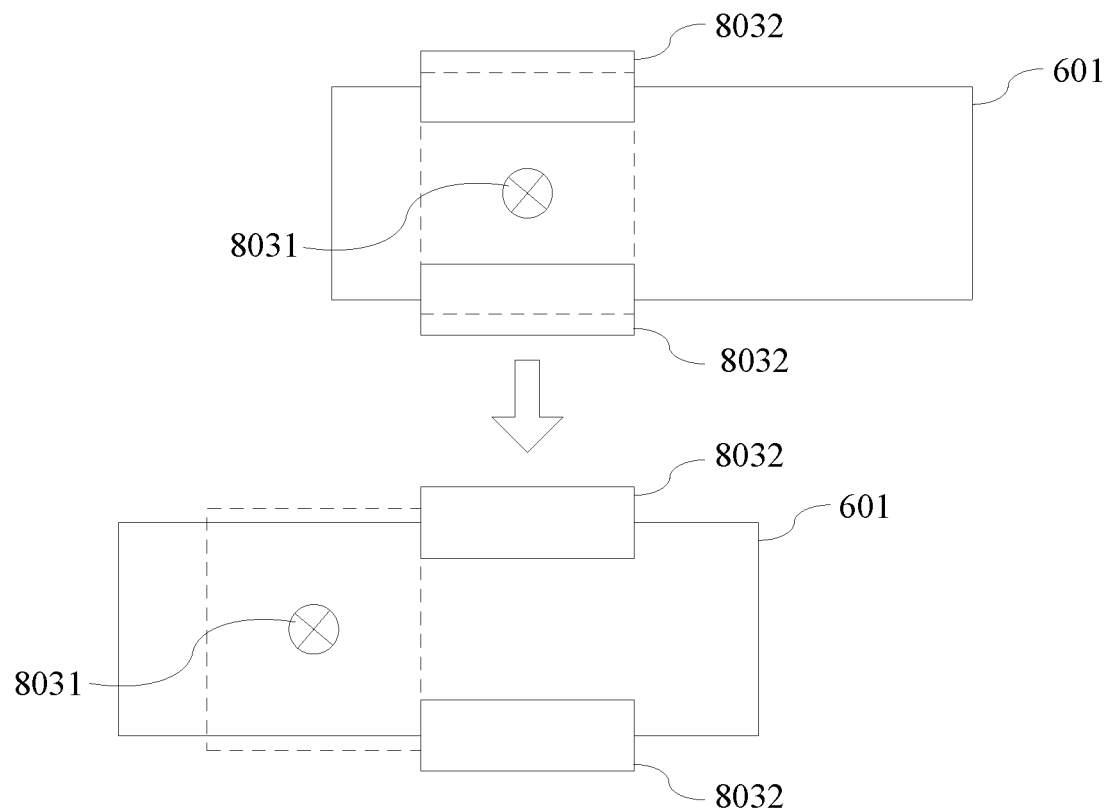
FIG. 12 is a schematic diagram of another light irradiation process according to an embodiment of the present disclosure.

FIG. 12 is a schematic diagram of another light irradiation process according to an embodiment of the present disclosure. As shown in FIG. 12, the light-shielded plate 8032 may remain unchanged, and the transparent substrate layer 601 and the light source 8031 are moved, such that the light-shielded plate 8032 is controlled to shield. Processes S2311 to S2313 are taken as an example. Referring to FIG. 12, in processes S2311 to S2313, the transparent substrate layer 601 is irradiated by the light source 8031. In this case, the photocurable coating disposed at the edge of the transparent substrate layer 601 is shielded by the light-shielded plate 8032 within the range illuminable by the light source 8031. In step S2313, the transparent substrate layer 601 and the light source 8031 are moved until the light-shielded plate 8032 is outside the range illuminable by the light source 8031, and then light irradiation is continued.

Due to the movement is relative, in FIG. 12, the transparent substrate layer 601 and the light source 8031 may remain unchanged, but the light-shielded plate 8032 may be moved.

Figure 13:
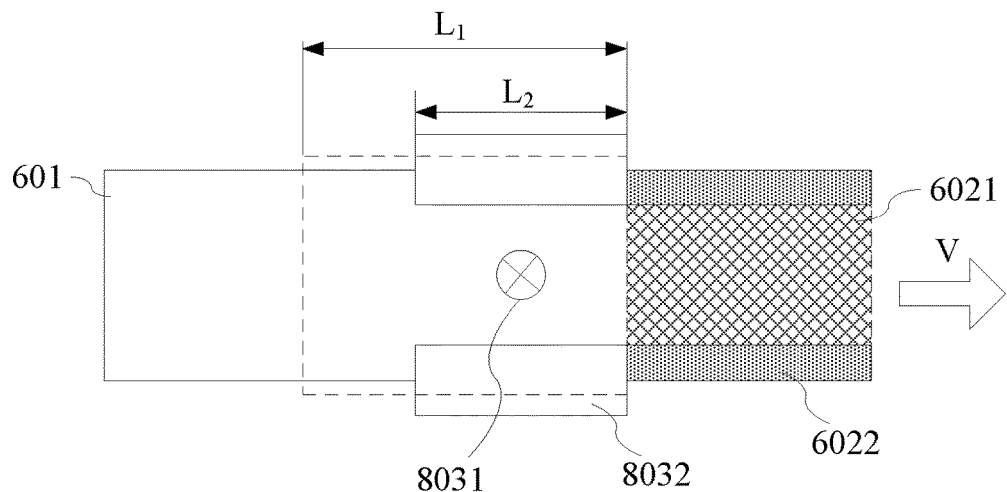
FIG. 13 is still a schematic diagram of a light irradiation process according to an embodiment of the present disclosure.

In the case that the protective film shown in FIG. 5 is manufactured, the light source 8031 and the light-shielded plate 8032 may remain unchanged, the transparent substrate layer 601 may be moved. In this way, a duration difference of light irradiation between the photocurable coating disposed on the middle portion of the transparent substrate layer 601 and the photocurable coating disposed at the edge of the transparent substrate layer 601 is generated. The transparent substrate layer 601 may be moved continuously. FIG. 13 is a schematic diagram of another light irradiation process according to an embodiment of the present disclosure. As shown in FIG. 13, along a length direction of the transparent substrate layer 601, the length of the range illuminable by the light source 8031 is $L_1$, and the length of the light-shielded plate 8032 is $L_2$, wherein $L_1 > L_2$. The transparent substrate layer 601 is moved at a speed of V. In this way, the duration T of the irradiated photocurable coating disposed on the middle portion of the transparent substrate layer 601 is $L_1/V$; the duration t of the irradiated photocurable coating disposed at the edge of the transparent substrate layer 601 is $L_1-L_2/V$. The duration difference between the duration T and the duration t is $L_2/V$. The duration T affects the hardness of the first region 6021, and the duration t affects the hardness of the second region 6022, such that the first region 6021 and the second region 6022 may reach desired hardness by adjusting $L_1$, $L_2$ and V.

The light irradiation processes shown in FIGS. 10 to 13 are only three possible examples for illustrating the shielding performed with the light-shielded plate 8032, provided that the duration difference of light irradiation is present between the photocurable coating disposed on the middle portion of the transparent substrate layer 601 and the photocurable coating disposed at the edge of the transparent substrate layer 601.

Figure 14:
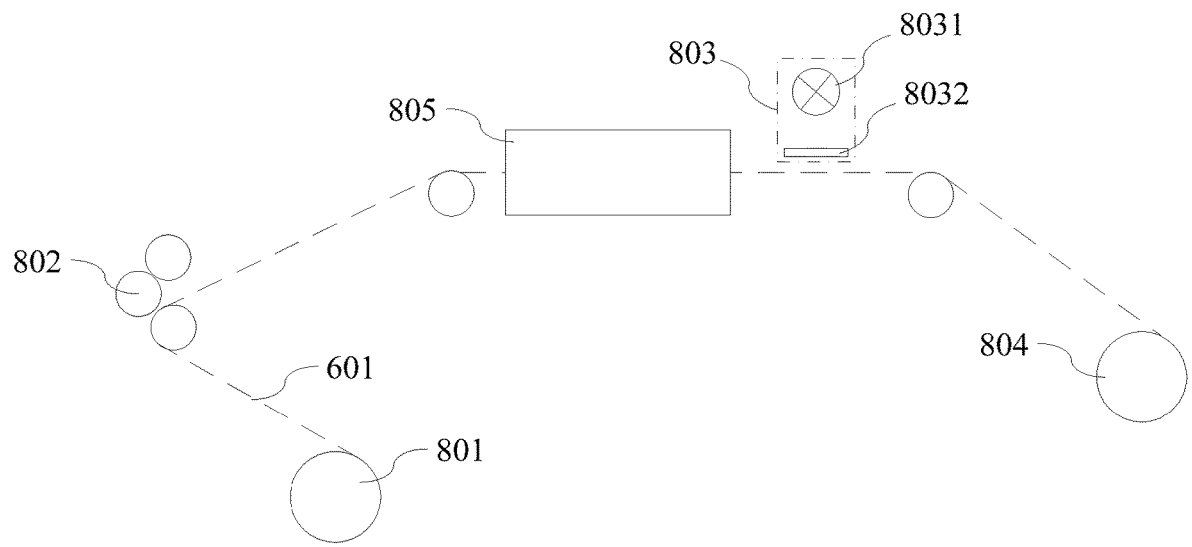
FIG. 14 is a structural schematic diagram of a device for manufacturing a protective film according to an embodiment of the present disclosure.

FIG. 14 is a structural schematic diagram of a device for manufacturing a protective film according to an embodiment of the present disclosure. As shown in FIG. 14, the device includes a substrate storage reel 801, a coating roller 802 and a curing equipment 803. The substrate storage reel 801 and the coating roller 802 are arranged in parallel and spaced apart from each other. The substrate storage reel 801 is configured to unreel a substrate film. The coating roller 802 is configured to coat a coating on the substrate film unreeled from the substrate storage reel 801. The curing equipment 803 is configured to cure the coating on the substrate film to a transparent hardened layer.

In the case that the protective film is manufactured, the substrate storage reel 801 provides a transparent substrate layer, the transparent substrate layer is unreeled from the substrate storage reel 801 and passes through the coating roller 802 which coats acured coating on the transparent substrate layer during rotation, and the cured coating is cured to the transparent hardened layer under the action of the curing equipment 803 when the transparent substrate layer coated with the cured coating passes through the curing equipment 803.

As shown in FIG. 14, the manufacturing device further includes a protective film storage reel 804. The protective film storage reel 804 is configured to roll up the substrate film unreeled from the substrate storage reel 801. The protective film storage reel 804 rotates to roll up the manufactured protective film onto the protective film storage reel 804, so as to store the protective film, and unreels the protective film before use.

In some embodiments, the cured coating coated by the coating roller 802 may be a photocurable coating. The curing equipment 803 may include a light source 8031 and a light-shielded plate 8032, wherein the light source 8031 may be an ultraviolet light source. The photocurable coating may be cured by a cross-linking reaction under light irradiation, and the hardness after curing is related to a duration of the light irradiation. The photocurable coating disposed at the edge of the transparent substrate layer 601 may he shielded by the light-shielded plate 8032, such that the photocurable coating disposed on the middle portion of the transparent substrate layer 601 and the photocurable coating disposed at the edge of the transparent substrate layer 601 may be subjected to different durations of light irradiation. As a result, a first region with a higher hardness and a second region with a lower hardness are formed.

In some embodiments, the device for manufacturing a protective film may further include a drying equipment 805. The drying equipment 805 is disposed between the coating roller 802 and the curing equipment 803, so as to dry the cured coating coated on the transparent substrate layer. In an exemplary embodiment, the drying equipment 805 may be a drying oven, and the transparent substrate layer coated with photocurable coating may pass through the drying oven. The cured coating may be preliminarily shaped by removing a liquid medium in the cured coating during drying.

Figure 15:
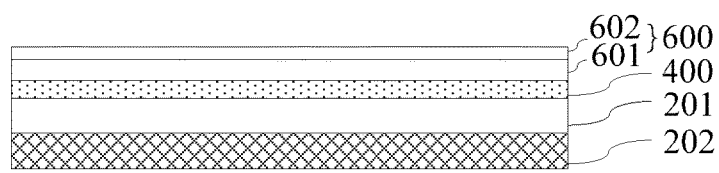
FIG. 15 is a structural schematic diagram of a touch panel according to an embodiment of the present disclosure.

FIG. 15 is a structural schematic diagram of a touch panel according to an embodiment of the present disclosure. As shown in FIG. 15, the touch panel includes a transparent substrate 201, a touch structure 202 disposed on the transparent substrate 201 and a protective film 600. The protective film 600 is disposed on one side of the transparent substrate 201, and the touch structure 202 is disposed on the other side of the transparent substrate 201.

The transparent hardened layer of the protective film includes the first region and the second region. As a result, the first region disposed in the middle portion of the transparent substrate layer may provide better protection, and the second region disposed at the edge of the transparent substrate layer may avoid burrs or dents formed during cutting, such that air bubbles are not easily generated after the transparent hardened layer is attached to the transparent substrate, and warping and deformation are not easily caused by impacts of ambient temperature and humidity.

The protective film 600 may be bonded by an optical adhesive 400, wherein the transparent substrate layer 601 of the protective film 600 is proximal to the transparent substrate 201.

Both the transparent substrate 201 and the protective film 600 are in a rectangular shape, wherein the width of the first region of the protective film 600 is less than the width of the transparent substrate 201, and a difference between the widths ranges from 0.1 mm to 1 mm. The width of the first region may be set based on the width of a substrate to be protected. For example, the width of the first region of the protective film 600 is less than the width of the transparent substrate to be protected, and the difference between the widths may range from 0.1 mm to 1 mm. The width of the first region is slightly less than the width of the substrate to be protected, which ensures that the first region cannot be cut in the case that the protective film is cut.

Figure 16:
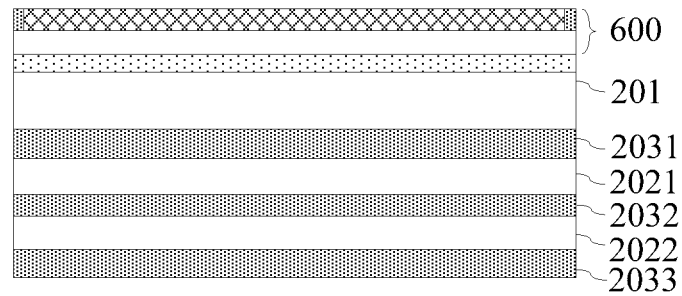
FIG. 16 is a sectional view of a touch panel according to an embodiment of the present disclosure.

FIG. 16 is a sectional view of a touch panel according to an embodiment of the present disclosure. As shown in FIG. 16, the touch structure 202 includes a first transparent insulation layer 2031 disposed on the transparent substrate 201, a first metal mesh 2021 disposed on the first transparent insulation layer 2031, a second transparent insulation layer 2032 disposed on the first metal mesh 2021, a second metal mesh 2022 disposed on the second transparent insulation layer 2032, and a third transparent insulation layer 2023 disposed on the second metal mesh 2022. The first metal mesh 2021 and the second metal mesh 2022 are insulated from each other to form touch electrodes. For example, the first metal mesh may be a drive electrode, and the second metal mesh may be an inductive electrode.

Figure 17:
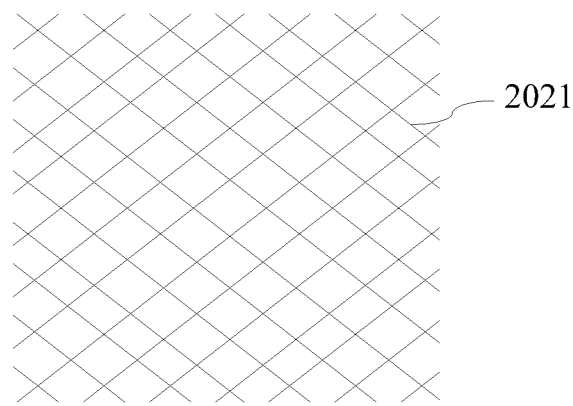
FIG. 17 is a structural schematic diagram of a first metal mesh according to an embodiment of the present disclosure.

FIG. 17 is a structural schematic diagram of a first metal mesh according to an embodiment of the present disclosure. As shown in FIG. 17, the first metal mesh 2021 has diamond-shaped meshes. The structure of the second metal mesh 2022 may be the same as that of the first metal mesh 2021.

Figure 18:
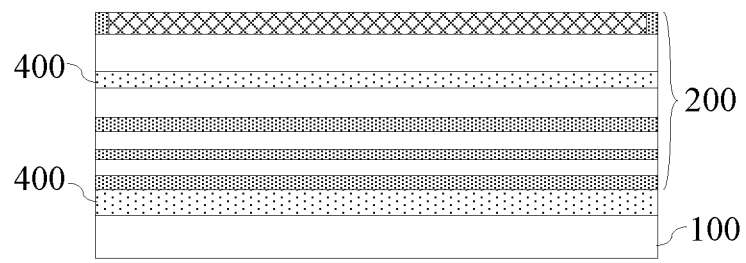
FIG. 18 is a structural schematic diagram of a display device according to an embodiment of the present disclosure.

FIG. 18 is a structural schematic diagram of a display device according to an embodiment of the present disclosure. As shown in FIG. 18, the display device includes a display panel 100 and a touch panel 200 shown in FIG. 15. The display panel 100 is disposed at a side, distal from the protective film 600, of the transparent substrate 201 of the touch panel 200.

The display device may be any product or component with a display function, such as a mobile phone, a tablet computer, a television, a monitor, a laptop, a digital photo frame or a navigator.

The transparent hardened layer includes the first region and the second region. As a result, the first region disposed in the middle portion of the transparent substrate layer may provide better protection, and the second region disposed at the edge of the transparent substrate layer may avoid burrs or dents formed during cutting, such that air bubbles are not easily generated after the transparent hardened layer is attached to the transparent substrate, and warping and deformation are not easily caused by impacts of ambient temperature and humidity.

In an exemplary embodiment, the display panel 100 may be a liquid crystal display panel or an organic light emitting diode (OLED) display panel.

The display device may be a one glass metal mesh (OGM) integrated capacitive touch screen. As shown in FIG. 18, the touch panel 200 and the display panel 100 are bonded by an optical adhesive 400, and the transparent substrate layer 601 of the protective film 600 and the transparent substrate 201 of the touch panel 200 are bonded by the optical adhesive 400.

The display panel 100 may have a thickness of 1350 μm. The optical adhesive 400 for bonding the display panel 100 with the touch panel 200 may have a thickness of 250 μm. The touch panel 200 may have a thickness of 550 μm. The optical adhesive 400 for bonding the touch panel 200 with the protective film 600 may have a thickness of 150 μm Described above are merely optional embodiments of the present disclosure, but are not intended to limit the present disclosure. Any modifications, equivalent replacements, improvements and the like made within the spirit and principles of the present disclosure should be included within the protection scope of the present disclosure.

What is claimed is:

1. A protective film, the protective film is configured to be attached to a substrate to protect the substrate from being damaged, and the protective film comprises a transparent substrate layer and a transparent hardened layer covering a surface of the transparent substrate layer, wherein the transparent hardened layer comprises a first region covering a middle portion of the transparent substrate layer and a second region covering an edge of the transparent substrate layer, a hardness of the first region being greater than a hardness of the second region; and
   wherein the transparent hardened layer is formed from a photocurable coating on the surface of the transparent substrate layer, and
   wherein the photocurable coating is cured by light irradiation, and the light irradiation duration of the photocurable coating disposed on the middle portion of the transparent substrate layer is longer than a light irradiation duration of the photocurable coating disposed at the edge of the transparent substrate layer.

2. The protective film according to claim 1, wherein the hardness of the first region ranges from 5.5 H to 6.5 H, and the hardness of the second region ranges from 2.5 H to 3.5 H.

3. The protective film according to claim 1, wherein a thickness of the transparent hardened layer is not greater than 10 μm.

4. The protective film according to claim 1, wherein
   the second region is disposed around the first region; or
   the transparent substrate layer is provided with two opposite sides that are arranged in parallel, and the second region is disposed on each of the two opposite sides of the transparent substrate layer.

5. The protective film according to claim 4, wherein a width of the second region in a direction perpendicular to the two sides ranges from 200 mm to 205 mm.

6. A method for manufacturing a protective film, comprising:
providing a transparent substrate layer; and
forming a transparent hardened layer covering a surface of the transparent substrate layer on the transparent substrate layer, wherein the transparent hardened layer comprises a first region covering a middle portion of the transparent substrate layer and a second region covering an edge of the transparent substrate layer, a hardness of the first region being greater than a hardness of the second region; and
wherein the protective film is configured to be attached to a substrate to protect the substrate from being damaged; and
wherein forming the transparent hardened layer covering the surface of the transparent substrate layer on the transparent substrate layer comprises:
forming a photocurable coating on the surface of the transparent substrate layer; and
curing, by light irradiation, the photocurable coating into the transparent hardened layer, wherein a light irradiation duration of the photocurable coating disposed on the middle portion of the transparent substrate layer is longer than a light irradiation duration of the photocurable coating disposed at the edge of the transparent substrate layer.

7. The method according to claim 6, wherein curing, by light irradiation, the photocurable coating into the transparent hardened layer comprises:
irradiating the photocurable coating with light;
shielding, using the light-shielding plate, the photocurable coating disposed at the edge of the transparent substrate layer; and
continuing to irradiate the photocurable coating with light.

8. The method according to claim 6, wherein curing, by light irradiation, the photocurable coating into the transparent hardened layer comprises:
shielding, using a light-shielding plate, the photocurable coating disposed at the edge of the transparent substrate layer;
irradiating the photocurable coating with light; and
removing the light-shielded plate and continuing to irradiate the photocurable coating with light.

9. The method according to claim 8, wherein shielding, using the light-shielding plate, the photocurable coating disposed at the edge of the transparent substrate layer comprises:
shielding the photocurable coating disposed around the transparent substrate layer; or
shielding the photocurable coating disposed at a group of opposite sides of the transparent substrate layer, wherein the transparent substrate layer is in a rectangular shape.

10. A touch panel, comprising: a transparent substrate, a touch structure disposed on the transparent substrate, and a protective film; wherein
the protective film is configured to be attached to the transparent substrate to protect the transparent substrate from being damaged, and comprises a transparent substrate layer and a transparent hardened layer covering a surface of the transparent substrate layer, wherein the transparent hardened layer comprises a first region covering a middle portion of the transparent substrate layer and a second region covering an edge of the transparent substrate layer, a hardness of the first region being greater than a hardness of the second region; and
the protective film is disposed on one side of the transparent substrate, and the touch structure is disposed on the other side of the transparent substrate; and
wherein the transparent hardened layer is formed from a photocurable coating on the surface of the transparent substrate layer, and
wherein the photocurable coating is cured by light irradiation, and the light irradiation duration of the photocurable coating disposed on the middle portion of the transparent substrate layer is longer than a light irradiation duration of the photocurable coating disposed at the edge of the transparent substrate layer.

11. The touch panel according to claim 10, wherein a width of the first region of the protective film is less than a width of the transparent substrate, and a difference between the widths ranges from 0.1 mm to 1 mm.

12. The touch panel according to claim 10, wherein the touch structure comprises a first transparent insulation layer disposed on the transparent substrate, a first metal mesh disposed on the first transparent insulation layer, a second transparent insulation layer disposed on the first metal mesh, a second metal mesh disposed on the second transparent insulation layer, and a third transparent insulation layer disposed on the second metal mesh.

13. A display device, comprising: a display panel and the touch panel as defined in claim 10, wherein the display panel is disposed at a side, distal from the protective film, of the transparent substrate.

14. The touch panel according to claim 10, wherein the hardness of the first region ranges from 5.5 H to 6.5 H, and the hardness of the second region ranges from 2.5 H to 3.5 H.

15. The touch panel according to claim 10, wherein a thickness of the transparent hardened layer is not greater than 10 μm.

16. The touch panel according to claim 10, wherein
the second region is disposed around the first region; or
the transparent substrate layer is provided with two opposite sides that are arranged in parallel, and the second region is disposed on each of the two opposite sides of the transparent substrate layer.

17. The touch panel according to claim 16, wherein a width of the second region in a direction perpendicular to the two sides ranges from 200 mm to 205 mm.

* * * * *